May 3, 1960 R. W. LEDGERWOOD 2,935,331
CART
Filed June 6, 1958
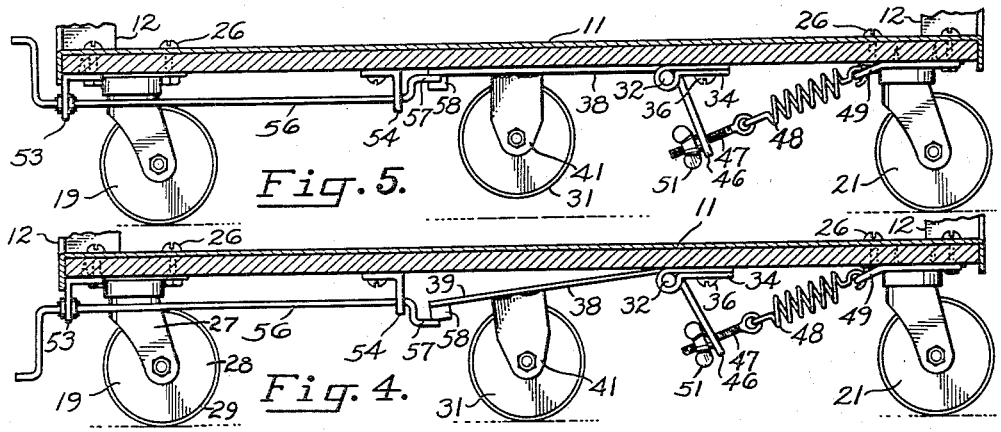
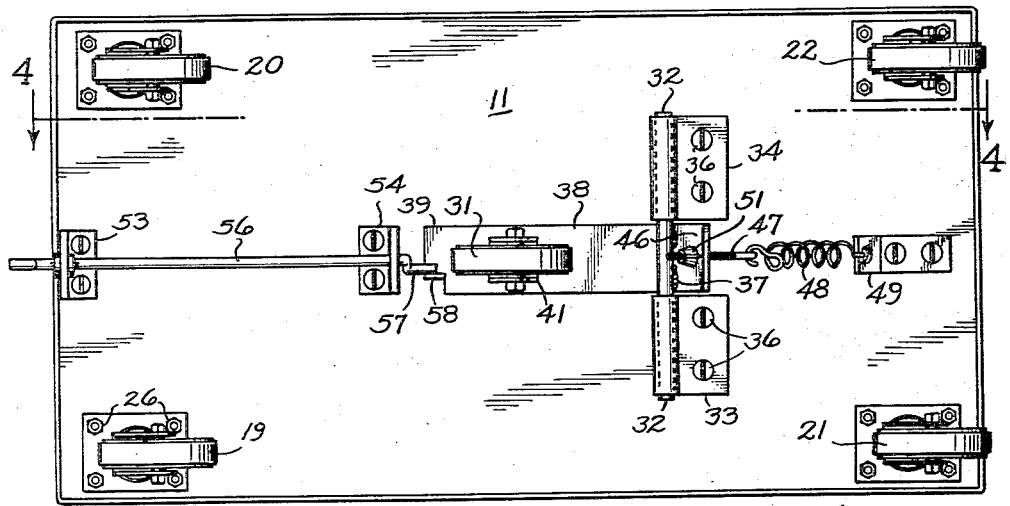
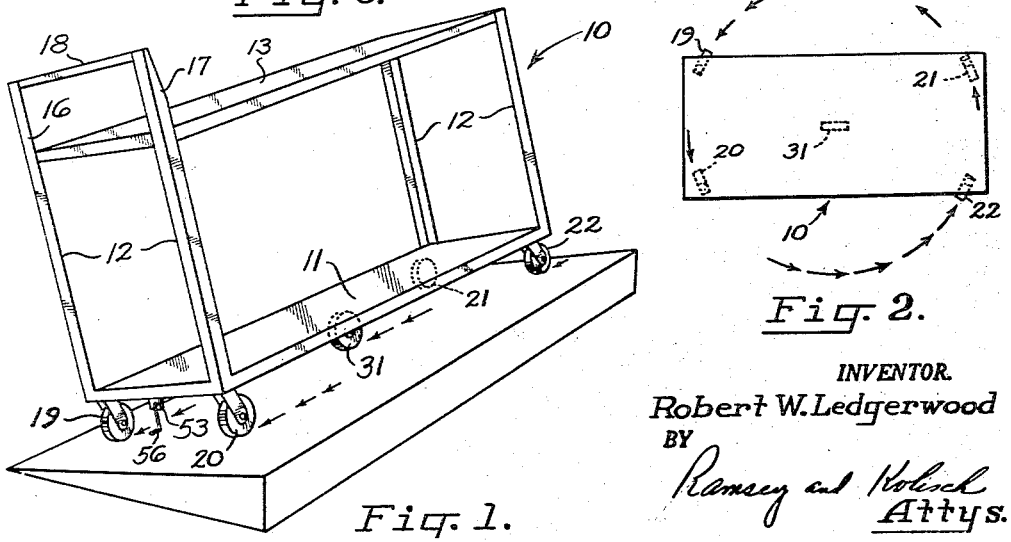
INVENTOR.
Robert W. Ledgerwood
BY
Ramsey and Kolisch
Attys.

United States Patent Office 2,935,331
Patented May 3, 1960

2,935,331

CART

Robert W. Ledgerwood, Portland, Oreg., assignor to Rol-Away Truck Manufacturing Company, Inc., Portland, Oreg., a corporation of Oregon Application June 6, 1958, Serial No. 740,424

4 Claims. (Cl. 280—79.3)

This invention relates to hand trucks and carts, and more particularly to trucks of the type which are typically employed in stockrooms, warehouses, and the like, for moving articles from one location to another.

Generally, it is an object of this invention to provide a truck construction characterized by a novel roller means for the truck which enables the hand truck to be maneuvered readily through tight angles and over sloping surfaces. The hand truck is maneuverable by a single operator over substantially all types of floors and through substantially all types of angles normally found in warehouses and stores.

Garment racks, merchandise racks, and general conveying racks for stores are ordinarily provided with wheels supporting their frames to make them easily transportable. A standard construction employs a so-called "diamond mount," which has two centrally disposed non-swiveling wheels supporting opposite sides of the rack frame, and a pair of swivel casters, one at the forward and one at the rear end of the truck. The frame for the rack or truck rocks about the center non-swiveling wheels, and the frame when at rest is additionally supported by the front or the rear swivel caster depending upon which end of the frame is tilted downwardly. Most of the mass of the truck is supported by the center pair of non-dirigible wheels. While this type of truck is maneuverable to a certain extent, its greatest deficiency is that it cannot be moved sidewise into position. The truck must be swung around the center pair of support wheels to turn the truck sidewise. Since the truck swings about a center point and cannot be moved laterally, the ultimate position of the truck is always somewhat back and away from the forward end of the truck prior to turning it sidewise.

Other types of commercial hand trucks employ swivel wheels entirely which non-rockably support the frame of the truck. The swivel wheels customarily are located at each end and on either side of the truck. In this type of construction, the truck is maneuverable in a direction extending along its length, from side to side, or at any angle relative to the truck length. However, in moving the truck over the floor rapidly, the truck often tends to swerve to one side or the other rather than maintain a straight, linear direction, due to irregularities which affect the free swiveling movement of the caster wheels. Further, the truck is quite unmanageable on sloping or laterally inclined surfaces, the mass of the truck tending to urge the truck downwardly in a direction following the incline. Such trucks, if they are to be used at all on inclined surfaces, require that two operators guide the truck along the incline.

This invention contemplates a hand truck having a frame and swivel casters which engage the ground and non-rockably provide the primary support for the sides and ends of the frame. In other words, the swivel casters support the sides and ends of the frame in a fixed angular position relative to the ground plane, as compared to the diamond type mount where the frame rocks over a center pair of non-swiveling wheels. The hand truck of this invention is also equipped with a rotatable roller wheel spaced intermediate the swivel casters. The roller wheel is non-swiveling or non-dirigible, rotating in a plane which is fixed relative to the frame for the truck about a transverse axis. The non-swiveling roller wheel engages the ground intermediate the swivel casters for the truck and functions to limit the hand truck to lineal movement in a given direction when in ground engaging position.

The periphery of the roller wheel resiliently engages the ground when in a ground engaging position with a force of small enough magnitude to enable the swivel wheels to be maintained in load supporting relation with the ground. In other words, the roller wheel may be substantially non-load carrying. This enables the truck to be moved readily over rough or uneven surfaces with the weight of the truck supported substantially uniformly upon the swivel casters for the truck. In maneuvering about corners and angles, the truck may be turned about a radial center corresponding to the location of the roller wheel. On inclined or sloping surfaces, however, the non-dirigible roller wheel functions, somewhat in the manner of a colter wheel in farm implements, to keep the truck moving in a straight course without lifting the ground engaging swivel casters off the ground.

Another feature and object of the invention is the provision of such a non-swiveling roller wheel which may be selectively adjusted between a ground-engaging and a ground-clearing position. This enables the cart to be moved sideways into a constricted area by the simple expedient of raising the roller wheel from off the ground. Raising the wheel prevents the wheel from tending to steer the truck, and also prevents wear to the roller wheel which would occur if it were slid sideways over the ground.

The size of loads handled may vary depending upon the type of operation in which the truck is employed. With heavy loads, the downward thrust of the non-swiveling roller wheel may be greater for effective steering than in an operation where relatively light loads are being handled. For this reason, it is an object of this invention to include a means for varying the force with which the periphery of the roller wheel resiliently engages the ground when in a ground-engaging position. In an embodiment, this means takes the form of a biasing spring operating to urge the non-swiveling roller wheel into ground contact. The force of the biasing spring may be adjusted by a screw device or similar type arrangement, so that downward force exerted by the spring on the roller wheel is not sufficient to cause the roller wheel to lift any of the swivel wheels from off the ground.

This invention is further characterized by novel means for raising and lowering the non-swiveling roller wheel between its ground-engaging and ground-clearing positions. In a specific embodiment, a crank protruding outwardly from one side of the base of the cart is employed. The inner end of the crank has an offset end which, when turned, operates to move against a bracket mounting the center wheel thereby to raise the bracket and the wheel carried by the bracket upwardly from the floor. The crank is turned so that the offset end moves to an over center position when raising the wheel, and in this way the roller wheel is locked in ground-clearing position. The assembly is easily adjusted to a lowered position by turning the crank in the opposite direction.

These and other objects and novel features are attained by this invention, the invention being described hereinbelow in conjunction with the accompanying drawings wherein:

Fig. 1 is a perspective view of a transfer truck or cart constructed according to an embodiment of this invention showing the cart having a non-swiveling roller wheel traveling over an inclined surface;

Fig. 2 is a top view of the cart, in slightly smaller scale, illustrating the manner in which the cart may be turned when the roller wheel is in a lowered position;

Fig. 3 is an enlarged view looking upwardly at the base of the transfer truck or cart illustrated in Fig. 1;

Fig. 4 is a section view along line 4—4 in Fig. 3, showing the non-swiveling roller wheel in its ground-engaging position; and Fig. 5 is a view similar to Fig. 4 save that the roller wheel is shown in a raised or ground-clearing position.

Referring now to the drawings for a description of a specific embodiment of this invention, and more particularly to Fig. 1, the cart illustrated comprises a frame indicated at 10 comprised of frame base 11, four uprights 12 extending vertically upwardly from the frame base and defining the peripheral outline of the truck, and a top 13 parallel to base 11 and fixed to uprights 12. The uprights at one end of the cart may be extended as at 16 and 17, these extensions being joined at their top by a bar 18 which serves as a hand rail for guiding the truck as it is moved over the ground.

Referring now to Figs. 3, 4, and 5, affixed to the forward end of the cart are a pair of swivel casters, indicated at 19 and 20, and affixed to the rear end of the cart are another pair of swivel casters, indicated at 21 and 22. Thus a caster is located at each side of the frame at each end. Each swivel caster is attached to the frame as by securing them to the base 11 by means of screw assemblies 26. Each of the swivel casters includes a bifurcated portion 27 rotatable about a vertical axis and rotatably mounting at its bifurcated end for movement about a horizontal axis a roller wheel 28. The wheel may be of solid construction and provided with a rubber wearing surface 29. The ground-contacting portions of casters 19, 20, 21, 22 define a support plane for the truck and non-rockably support the truck.

Intermediate the casters, preferably approximately centrally of the base 11, is a non swiveling roller wheel indicated at 31. The roller wheel is mounted in retractable mechanism which permits the wheel selectively to be adjusted vertically between the ground-engaging position illustrated in Fig. 4 and the raised or ground-clearing position illustrated in Fig. 5.

Specifically, rotatably carried for rotation about its longitudinal axis on the under side of base 11 is a pivot rod 32. The pivot rod is mounted in a pair of brackets 33, 34 secured as by screws 36 to frame base 11. Affixed as by welds 37 to the rotatable pivot rod is a pivoting bracket 38. Pivot bracket 38 has a non-pivoted end 39 which extends beneath the truck or cart approximately to its center.

Roller wheel 31 is affixed to the non-pivoted end 39 of the pivot bracket. Wheel 31 rotates in bifurcated support 41 which is immovably fixed directly to the lower side of end 39. Wheel 31 rotates about a transverse axis, and the plane of the wheel corresponds approximately to a longitudinal plane extending vertically along the length of base 11.

Bracket 38 is provided with an end 46 which depends downwardly from the base of the frame and has extending therethrough an eye screw 47. The eye of eye screw 47 carries one end of a tension spring 48, the other end of the tension spring being secured to an anchor bracket 49. Eye screw 47 is adjustably positioned in end 46 by a wing nut 51. The tension of bias spring 48 urges bracket 38 in a counterclockwise direction about its pivot center, which constitutes pivot rod 32, and in this way the periphery of the roller wheel is resiliently urged against the ground. Wing nut 51 constitutes adjustable means regulating the bias of spring 48.

Rotatably mounted in brackets 53 and 54 affixed to base 11 is a crank arm 56. One end of the crank arm extends outwardly beyond the peripheral outline of base 11 and is provided with a handle portion accommodating rotation of the crank arm. The other end of the crank arm includes an offset end portion 57. Offset end portion 57 is located under and engages when turned the under side of pivot bracket 38. Pivot bracket 38 is provided with a depending ear 58 limiting movement of the offset end when the crank arm is rotated. Ear 58 is so spaced so that the offset end portion of crank arm 56 moves past an over-center position before engaging ear portion 58. This locks the wheel 31 in a raised position.

In operation, the bias of bias spring 48 is adjusted so that the periphery of the roller wheel is resiliently urged against the ground with a force of small enough magnitude to enable the swivel casters to be maintained in load-supporting relation with the ground. In this way, the swivel casters at all times remain load-supporting wheels. With heavier loads, the tension of spring 48 may be increased over that used with lighter loads.

The resilient bias with which the roller wheel contacts the ground in the embodiment illustrated is determined by the tension of tension spring 48, wheel 31 resembling wheels 19, 20, 21, and 22. If desired, a pneumatic wheel or tire may be used in conjunction with the roller wheel, the tire itself in this instance giving slightly to take care of non-conformities in the level of the ground and providing the resilient bias with which the wheel contacts the ground.

When the cart of this invention is transported over an inclined surface as illustrated in Fig. 1, the roller wheel, when in a ground-engaging position, serves to maintain movement of the cart in a lineal direction. The cart may be swung about a turning point which coincides with the location of the roller wheel, as illustrated in Fig. 2. In this instance the outer caster wheels turn as indicated by the outlines in Fig. 2, the truck turning in a circular area whose radius corresponds to substantially half the overall length of the truck.

When it is desired to move the truck sideways into a confined area, the roller wheel may be raised from the ground by rotating crank arm 56 so that the wheel travels to the position shown in Fig. 5. This permits the caster wheels to turn and the truck to move freely at any angle relative to the length of the truck.

It is claimed and desired to secure by Letters Patent:

1. In a hand truck having a frame and swivel casters mounted under said frame in load-engaging position and adapted non-rockably to support the sides and ends of said frame, a non-swiveling roller wheel rotatable about a horizontal transverse axis and mounted in ground-engaging position under said frame together with said casters, said roller wheel being mounted under said frame substantially centrally of the sides and ends of said frame intermediate said swivel casters and limiting the hand truck to lineal movement, the mounting for said roller wheel having retractable selective means for lifting said roller wheel from its ground-engaging position to a ground-clearing position, said mounting also having a spring operatively interposed between said frame and roller wheel and adjustable means regulating the bias of said spring, said spring urging the body of said roller wheel downwardly relative to said swivel casters with the wheel in its ground-engaging position whereby the periphery of said roller wheel yieldably and resiliently engages the ground.

2. In a hand truck, a frame, a pair of spaced swivel casters mounted at each end of the frame, one of said pair at each side of the frame, respectively, said swivel casters supporting said frame for movement over the ground with the ground-contacting portions of the swivel casters defining a support plane for the truck, a bracket pivotally mounted on the base of said frame with a non-pivoted end of said bracket spaced centrally between said casters, a non-swiveling roller wheel rotatably mounted on said non-pivoted end of said bracket for movement about a transverse axis, biasing means interposed between said bracket and said frame urging said roller wheel downwardly toward said support plane, said biasing means including means for adjusting the force of said biasing means, and a crank member mounted beneath said frame with one end protruding outwardly beyond the peripheral outline thereof and with its other end engaging said bracket, said crank member being adjustable between a hold position wherein said roller wheel is raised upwardly against the bias of said biasing means and a release position accommodating movement of said roller wheel downwardly under the urging of said biasing means.

3. In a hand truck, the combination of a frame having an elongated base of substantially rectangular outline, a caster mounted under said frame adjacent each corner of said base and supporting said frame, said casters being mounted in ground-engaging position with the base of their peripheries defining a common plane, a non-swiveling roller wheel rotatable about a horizontal axis mounted under said frame substantially centrally between the sides and the ends of said base, and mounting means rotatably mounting said roller wheel with the wheel in ground-engaging position together with said casters, said mounting means comprising bias means urging the base of the roller wheel toward the plane defined by the base of the peripheries of said casters while accommodating movement of the base of the roller wheel upwardly from said plane, means for adjusting the bias of said bias means, and retracting means for lifting said roller wheel from its ground-engaging to a ground-clearing position.

4. In a hand truck, the combination of a frame having a base of substantially rectangular outline, a caster mounted under said frame adjacent each corner of said base and supporting said frame, said casters being mounted in ground-engaging position with the base of their peripheries defining a common plane, non-swiveling roller wheel means disposed beneath said frame and located substantially centrally of the casters, means yieldably and resiliently mounting the periphery of said roller wheel means in ground-engaging position together with all of said casters, the latter means accommodating movement of the base of the periphery of said roller wheel means upwardly from plane defined by the bases of said casters, and retracting means for lifting said roller wheel means from its ground-engaging to a ground-clearing position.

References Cited in the file of this patent

UNITED STATES PATENTS

| | | |
|---|---|---|
| 537,871 | Toye | Apr. 23, 1895 |
| 682,662 | Bartholomew | Sept. 17, 1901 |
| 988,677 | Vanmanen | Apr. 4, 1911 |
| 1,557,815 | Dorsey | Oct. 20, 1925 |
| 2,563,919 | Christensen | Aug. 14, 1951 |
| 2,614,863 | Schramm | Oct. 21, 1952 |
| 2,663,048 | Ross | Dec. 22, 1953 |
| 2,812,189 | Geldhof | Nov. 5, 1957 |
| 2,843,392 | Simpkins | July 15, 1958 |

FOREIGN PATENTS

| | | |
|---|---|---|
| 20,994 | Great Britain | of 1904 |
| 766,261 | Great Britain | Jan. 16, 1957 |